(12) United States Patent
Qian et al.

(10) Patent No.: US 6,226,388 B1
(45) Date of Patent: May 1, 2001

(54) METHOD AND APPARATUS FOR OBJECT TRACKING FOR AUTOMATIC CONTROLS IN VIDEO DEVICES

(75) Inventors: Richard J. Qian, Camas; Jeffrey B. Sampsell, Vancouver, both of WA (US)

(73) Assignee: Sharp Labs of America, Inc., Camas, WA (US)

( * ) Notice: Subject to any disclaimer, the term of this patent is extended or adjusted under 35 U.S.C. 154(b) by 0 days.

(21) Appl. No.: 09/225,187

(22) Filed: Jan. 5, 1999

(51) Int. Cl.$^7$ .................................................. G06K 9/00
(52) U.S. Cl. ................................................................ 382/103
(58) Field of Search ................................ 382/103, 107, 382/162, 164, 166, 167, 168, 169, 190, 195, 199, 224, 225, 260, 282, 286, 291, 305, 307, 309, 311; 348/169, 575, 577, 671, 672; 345/326, 327, 328, 333, 335, 520, 523, 507, 30, 33

(56) References Cited

U.S. PATENT DOCUMENTS

| 5,031,049 | 7/1991 | Toyama et al. | 358/227 |
|---|---|---|---|
| 5,187,585 | 2/1993 | Kaneda et al. | 358/227 |
| 5,412,487 | 5/1995 | Nishimura et al. | 358/452 |
| 5,422,828 | * 6/1995 | Choate et al. | 342/458 |
| 5,434,617 | 7/1995 | Bianchi | 348/170 |
| 5,473,369 | 12/1995 | Abe | 348/169 |
| 5,546,125 | 8/1996 | Tomitaka et al. | 348/169 |
| 5,552,823 | 9/1996 | Kageyama | 348/155 |
| 5,610,653 | 3/1997 | Abecassis | 348/110 |
| 5,631,697 | 5/1997 | Nishimura et al. | 348/172 |
| 5,696,503 | * 12/1997 | Nasberg | 340/933 |
| 5,714,999 | 2/1998 | Jeong et al. | 348/169 |
| 5,745,126 | * 4/1998 | Jain et al. | 382/154 |
| 5,798,787 | * 8/1998 | Yamaguchi et al. | 348/152 |
| 5,912,994 | * 6/1999 | Norton et al. | 382/283 |
| 5,982,909 | * 11/1999 | Erdem et al. | 382/103 |

OTHER PUBLICATIONS

Lucas, et al. An iterative Image Registration Technique with an Application to Stereo Vision, *Proc. Int. Joint Conf. Artificial Intelligence*, pp. 674–679, 1981.
Papanikolopoulos, et al. Visual Tracking of a Moving Target by a Camera Mounted on a Robot: A Combination of Control and Vision, *IEEE Transactions of Robotics and Automation*, vol. 9, No 1, Feb. 1993, pp. 14–35.

(List continued on next page.)

*Primary Examiner*—Andrew W. Johns
*Assistant Examiner*—Shervin Nakhjavan
(74) *Attorney, Agent, or Firm*—Marger Johnson & McCollom

(57) ABSTRACT

A method and apparatus for tracking of objects in video images. The tracking process includes the steps of: receiving an initial image with the object to be tracked; performing a color histogram on the initial image in the region where the object is located; receiving the next frame of the video sequence and specifying candidate regions in that image; using color histogram analysis on the candidate regions to find a match performing motion analysis to correct the analysis and to provide a prediction for the next frame; and, identifying and providing the tracked object's image for output. Apparatus that can use this method can be either video capture or video display. In video capture, a user interface allows the user to designate the object to be tracked during capture. The tracking module than controls the capture system to track that object. In video display systems, a user interface allows the user to identify the object in the display that should be tracked. The tracking module then adjusts the display to track that object.

10 Claims, 2 Drawing Sheets

OTHER PUBLICATIONS

Rehg, et al. Visual Tracking with Deformation Models, *Proceedings of IEEE Int'l Conference on Robotics and Automation*, vol. 9, No. 1, 1993, pp. 844–850.

Hager, et al. Real–Time Tracking of Image Regions with Changes in Geometry and Illumination, *Proceedings of IEEE Conference on Computer Vision and Pattern Recognition*, pp. 403–410.

Black, et al. Eigen Tracking: Robust Matching and Tracking of Articulated Objects Using a View–Based Representation, *Proceedings of European Conference on Computer Vision*, 1996, pp.329–341.

Swain, et al. Color Indexing, *International Journal of Computer Vision*, vol. 7, No. 1, 1991, pp. 11–32.

* cited by examiner

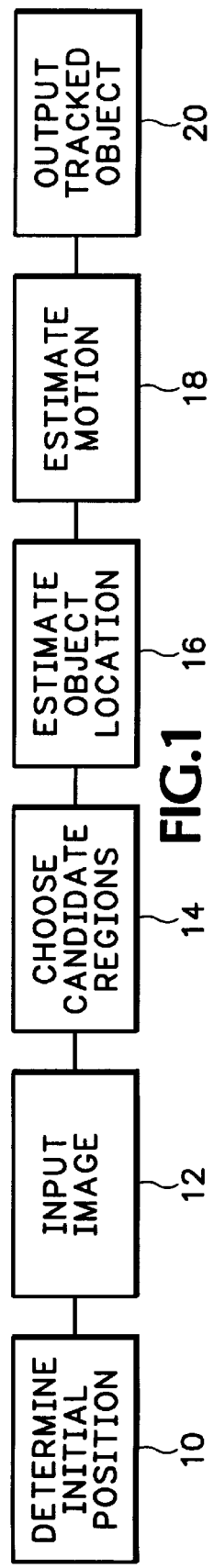
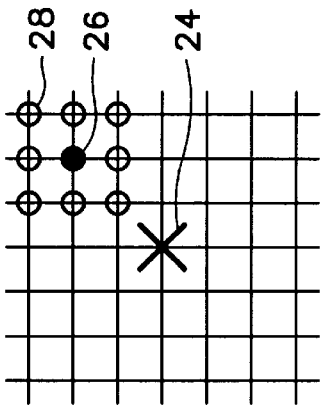
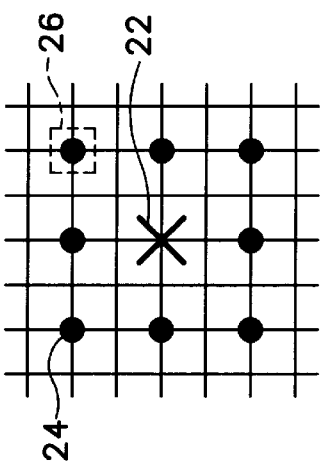
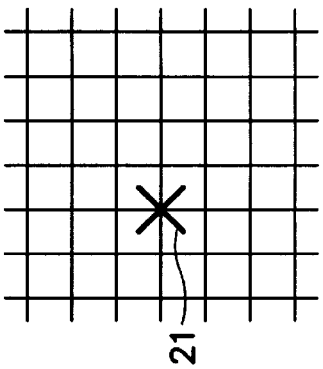

METHOD AND APPARATUS FOR OBJECT TRACKING FOR AUTOMATIC CONTROLS IN VIDEO DEVICES

BACKGROUND OF THE INVENTION

1. Field of the Invention

This invention relates to object tracking in video devices, more particularly for an automated process and apparatus to track objects in video images.

2. Background of the Invention

Video devices that capture or display video images use object tracking for several purposes. In one example, a video device automatically focuses the picture on a specific object. In another example, the device automatically zooms in on that object. Other purposes include correction of brightness or contrast of the object or highlighting the object in a display.

Current methods typically use one of three types of algorithms: 1) correlation between adjacent frames; 2) geometrical object models; or, 3) illumination models. Correlation techniques typically use either a dot product or sum of squared differences (SSD) analysis to compare images. A portion of the initial frame is compared against several candidate regions in the next frame. Either technique produces a score for each candidate region of the next frame compared to the initial frame. The highest score indicates the location of the object in the next frame.

The second type of algorithm, geometric techniques, uses geometric modeling of objects in the image. A three-dimensional model of an object, such as a face, is created and projected onto a number of two-dimensional planes corresponding to every possible angle of orientation of the object. An input image is then compared against each possible two-dimensional projection until a match is found. This technique is computationally expensive and does not contemplate other objects that can partially occlude the tracked object, such as if it moved behind something in the next frame.

A third current method of tracking objects uses illumination modeling. All kinds of illumination and all possible condition changes are developed, then used in analyzing the next image. This method can be exhaustive, although techniques are available to reduce the load. Even with these techniques, the illumination approach has a disadvantage if the illumination changes in a way that is not predicted, making the tracking inaccurate. Also, problems occur if the object being projected alters its orientation, which will change the illumination model of the object, and partial occlusion remains a problem for this technique as well.

In summary, these current techniques have one or more disadvantages. These include sensitivity to object orientation and/or scale changes, sensitivity to partial occlusions and shadows, sensitivity to camera automatic exposure and lighting condition changes, or they are computationally intensive. Higher computation intensity results in slow response time, making real-time processing problematic.

Therefore, a method and apparatus are needed that track objects quickly with a reduced sensitivity to these problems.

SUMMARY OF THE INVENTION

One embodiment of the invention is a method and apparatus for tracking objects in video images. The method involves developing a color histogram of region in a first image, which includes the object, establishing a reference histogram. The next frame of the video input is received and candidate regions are identified. Color histograms for the candidate regions are compared to the reference histogram and used to locate and identify the object being tracked. Motion analysis provides correction of object location for the current frame and provides a prediction for the next frame. The predication can be used to more accurately identify candidate regions.

The method can be improved or its performance altered with addition of option modules, such as one that smoothes the tracking trajectory.

Alternative embodiments of the invention include an apparatus for tracking objects in a video capture system, or a video display system.

BRIEF DESCRIPTION OF THE DRAWINGS

For a more complete understanding of the present invention and for further advantages thereof, reference is now made to the following Detailed Description taken in conjunction with the accompanying Drawings in which:

FIG. 1 shows a flow chart of a method to track objects in video images, in accordance with the invention.

FIG. 2 shows a method of identifying candidate regions, in accordance with the invention.

DETAILED DESCRIPTION OF THE PREFERRED EMBODIMENTS

Figure 3:
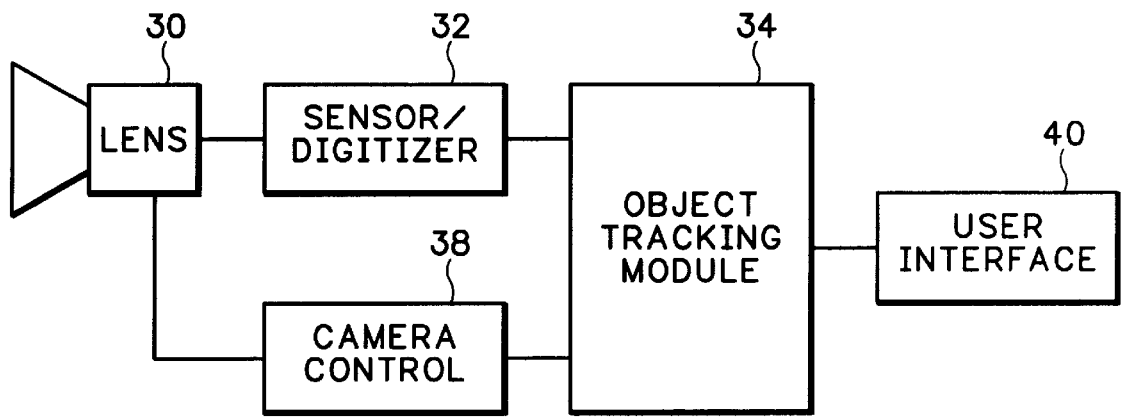
FIG. 3 shows one embodiment of tracking objects in a video capture system.

FIG. 1 illustrates one embodiment of a process for tracking objects in video images in accordance with the invention. At step 10, the initial position and size of the object to be tracked is determined by a user interface in which the user indicates the object. A color histogram is then computed for the object. This histogram will be referred to as the reference histogram. A color histogram is a two-dimensional table that records the pixel counts of different colors occurring in the regions.

The colors are registered in the two-dimensional chromaticity space. The chromaticity space is defined as follows:

$$r = \frac{R}{R+G+B}, g = \frac{G}{R+G+B}.$$

The object to be tracked will produce a unique set of values in this table that can then be used to locate the object.

In step 12, the next frame of the video sequence is received. Regions to study in order to locate the object are selected in step 14. The number of regions to be studied can be predetermined or selected adaptively. Predetermining the number of regions for the tracking algorithm may be more practical depending upon particular system characteristics including amount of memory available for storing motion history, processor capabilities and speed, and the particular application in which tracking is being used. Adaptive tracking allows the system to designate the number of regions at the time the tracking is applied, by analyzing the amount of motion history or other data available that will dictate more or fewer regions.

The initial position of an object in the initial frame is shown in FIG. 2a. The 'X' 21 shows the current position. This position, along with the motion trajectory is used to estimate the object position in the next frame shown in FIG. 2b.

The predicted position of the object to be tracked 22 is identified in the next frame, shown as the 'X' in FIG. 2b. Several candidate regions are identified in the frame surrounding the predicted position, such as those shown at 24 and 26. Analysis of the candidate regions, including that designated with an 'X' is performed. Once an initial analysis is performed on the candidate regions, further analysis is performed on the selected candidate region.

FIG. 2c shows further searching and identifying performed on the candidate region 26 and its surrounding candidate regions, such as the one shown at 28. All are analyzed for location of the tracked object, using histogram intersection.

The comparison between $H_{REF}$, the reference histogram, and a candidate histogram, $H_{CANDIDATE}$, is done by histogram intersection at step 16. The matching score is found as follows:

$$\text{score}(H_{REF}, H_{CANDIDATE}) = \frac{\sum_i \min(H_{REF}(i), H_{CANDIDATE}(i))}{\sum_i H_{CANDIDATE}(i)},$$

where $H_{REF}(I)$ and $H_{CANDIDATE}(I)$ are the ith elements of $H_{REF}$, $H_{CANDIDATE}$, respectively. The result gives the matching score for that region. The highest matching score among all the matching scores for all the candidate regions indicates the best estimate of the new position of the object.

At step 18, the process predicts the motion of the object using a filter, which is also used to smooth the motion trajectory and increase the accuracy of the selection of candidate regions. One example of such a filter is a linear Kalman filter.

In order to maintain computational simplicity, the motion of a tracked object may be modeled as a piece-wise constant two-dimensional translation within the image plane. A filter smoothes and predicts the two-dimensional translation velocity vector $(v_x, v_y)$ of the tracked object. The smoothed velocity vector assists in correcting the tracked position of the object at the current frame, and the predicted velocity helps to more accurately select candidate regions in the next frame.

In the below example, used for discussion purposes only, a linear Kalman filter was used. However, any filter that can smooth tracking and predict motion can be used.

The model for tracking motion in this example is:

$$x(k+1)=F(k)x(k)+w(k);$$

$$z(k+1)=H(k+1)x(k+1)+v(k+1);$$

where $x(k)$ is the true velocity vector to be estimated, $z(k)$ is the observed instantaneous velocity vector, $w(k)$ and $v(k)$ are white noise, and $F(k) \equiv I$, the identify matrix, for piece-wise constant motion.

The Kalman predictor is:

$$\hat{x}(k+1|k)=F(k)\hat{x}(k|k), \hat{x}(0|0)=0$$

$$\hat{z}(k+1|k)=H(k+1)\hat{x}(k+1|k).$$

This is used to predict motion in the next frame, making the selection of candidate regions to be analyzed for location of the object more accurate. The Kalman corrector is:

$$\hat{x}(k+1|k+1)=\hat{x}(k+1|k)+K(k+1)\Delta z(k+1|k)$$

$$\Delta z(k+1|k)=z(k+1)-\hat{z}(k+1|k);$$

where $K(k+1)$ is the Kalman gain. The Kalman gain is computed as: $K(k+1)=P(k+1|k)H^T(k+1)[H(k+1)P(k+1|k)H^T(k+1)+R(k+1)]^{-1}$. The Kalman corrector assists in identifying the correct candidate region analyzed for the object location. The Kalman gain is set depending upon how much of a correction is required. If the gain is high, the process will rely more on the current image. If the gain is low, the process will rely more upon the previous history and not the current image.

In determining the Kalman gain, the covariances are computed as follows:

$$P(k+1|k)=F(k)P(k|k)F^T(k)+Q(k), P(0|0)=P_0$$

$$P(k+1|k+1)=[I-K(k+1)H(k+1)]P(k+1|k);$$

where $Q(k)=E[w(k)w^T(k)]$, $R(k)=E[v(k)v^T(k)]$ and $P_0=E[x(0)x^T(0)]$.

After the motion is tracked and corrected, the object is displayed on the output image in step 20. This method can track several objects at one time. The initial position of each object must be determined. The method then performs the process set forth above on all objects.

Another adaptation may be to add further refinements to the location of the object as it is displayed. The use of candidate regions to locate the object by itself can lead to jittering of the region displayed around the object. One method to do this is to add a further module, such as a sum of square differences analysis module that increases the accuracy of the results, eliminating jitter. While the SSD analysis increases the computation load when used alone, it does not appreciably increase the load when used as a second step, in addition to the more efficient histogram analysis. Other types of refinement modules may be used in other applications. The selection of a refinement module, if any, is left to the designer.

This process can be implemented in several different types of systems. One such system for video capture is shown in FIG. 3. The camera lens subsystem 30 receives the image. The sensor/digitizer 32 provides the digital data to the object tracking processor 34, which then adjusts the camera control 38. The object-tracking module 34 contains a processor and any other circuitry determined by the designer to implement the object tracking procedure. The user interface 40 allows the user to identify the object to be tracked.

The user interface can be one of several different options. For example, in an image capture device, it could be a touch-screen liquid crystal display (LCD). The user identifies the object to be tracked by touching the object as it appears on a display screen showing the image or images being captured. In a video display device, the user interface could be very similar to that or it could be a mouse attached to a computer. In either case, the user interface is only limited in that it must allow the user to identify the object to be tracked by some sort of input.

Figure 4:
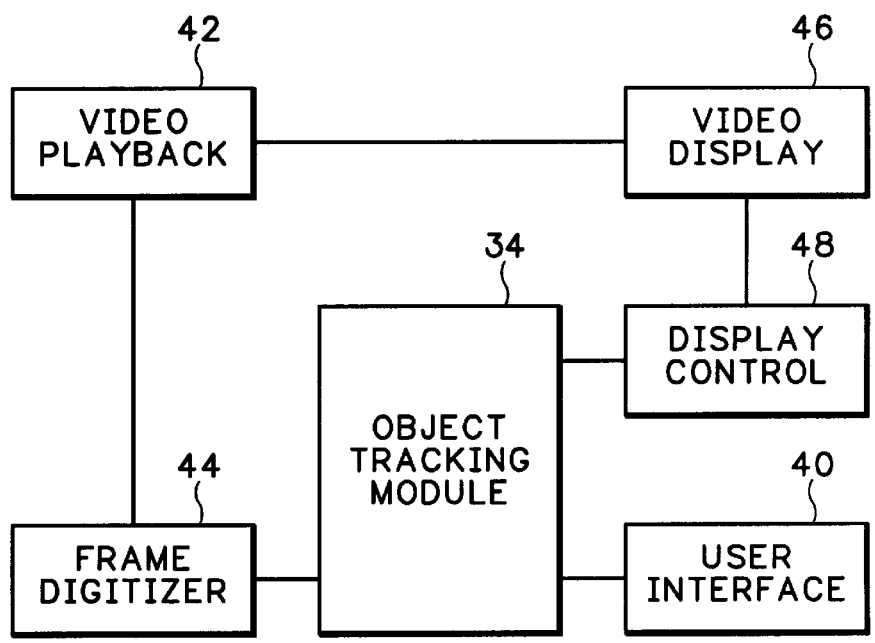
FIG. 4 shows one embodiment of tracking objects in a video display system.

A second embodiment of a system that can use this process is shown in FIG. 4, a video display system. The video playback module 42 provides the sequence of video images. The frame digitizer 44 produces the digital data for the object tracking processor 34, which includes the instructions for the object tracking procedure. The user interface 40 in this example allows the user to select the object to be tracked from the video image. The processor 34 provides input to the display control on the object to be tracked and adjusts the image provided to the video display 46 from the video playback 42. The adjustment may take the form of zooming on the object, highlighting the object or other means for identifying the object from the image.

In summary, the method for tracking objects in video images provides an efficient, robust method that does not suffer from the same disadvantages of others of such methods. It can be used in video capture or playback apparatus, depending upon the desired application.

Thus, although there has been described to this point a particular embodiment for a method and structure for a method and apparatus for tracking objects in a video image, it is not intended that such specific references be considered as limitations upon the scope of this invention except in-so-far as set forth in the following claims.

What is claimed is:

1. A method for tracking objects in video images, comprising the steps of:
   a) determining an initial position of an object to be tracked;
   b) storing a reference color histogram for said object, wherein the reference color histogram is registered in two-dimensional chromaticity space;
   c) receiving an incoming frame of video data;
   d) selecting a number of candidate regions in said incoming frame;
   e) comparing initial color histograms of each of said candidate regions and said reference color histograms;
   f) predicting and correcting said object motion using a linear filter; and
   g) identifying said tracked object from one of said candidate regions, using histogram intersection between the initial color histogram and the reference color histogram.

2. The method as claimed in claim 1, wherein said determining step is accomplished by a user interface.

3. The method as claimed in claim 1, wherein said linear filter further comprises a Kalman filter.

4. The method as claimed in claim 1, wherein said video image is provided by an image capture device.

5. The method as claimed in claim 4, wherein said image capture device is a video camera.

6. The method as claimed in claim 1, wherein said video image is provided by an image display device.

7. The method as claimed in claim 6, wherein said image display device is a computer.

8. The method as claimed in claim 1, wherein said number of candidate regions is a predetermined number.

9. The method as claimed in claim 1, wherein said number of candidate regions is determined adaptively.

10. A processor having a memory, the processor configured to perform the tasks of:

determining an initial position of an object to be tracked;

storing a reference color histogram for said object, wherein the reference color histogram is registered in two-dimensional chromaticity space;

receiving an incoming frame of video data;

selecting a number of candidate regions in said incoming frame;

comparing initial color histograms of each of said candidate regions and said reference color histograms;

predicting and correcting said object motion using a linear filter; and identifying said tracked object from one of said candidate regions, using histogram intersection between the initial color histogram and the reference color histogram.

* * * * *